United States Patent [19]

Sherman

[11] Patent Number: 4,883,404

[45] Date of Patent: Nov. 28, 1989

[54] GAS TURBINE VANES AND METHODS FOR MAKING SAME

[76] Inventor: Alden O. Sherman, 85 Weston Rd., Weston, Conn. 06883

[21] Appl. No.: 166,687

[22] Filed: Mar. 11, 1988

[51] Int. Cl.$^4$ .............................................. F01D 5/18
[52] U.S. Cl. .................................. 415/115; 415/160; 29/156.8 B
[58] Field of Search ............... 415/115, 116, 191, 192, 415/160, 190, 216–218; 416/97 R, 226; 29/156.8 B, 156.8 H

[56] References Cited

U.S. PATENT DOCUMENTS

| | | | |
|---|---|---|---|
| 2,357,628 | 9/1944 | Boerger | 415/216 X |
| 2,889,615 | 6/1959 | Stalker | 29/156.8 H |
| 3,123,283 | 3/1964 | Leis | 415/115 |
| 3,540,810 | 11/1970 | Kercher | 415/115 X |
| 3,864,058 | 2/1975 | Womack | 416/97 R |
| 4,193,738 | 3/1980 | Landis, Jr. et al. | 415/115 |
| 4,214,852 | 7/1980 | Tuley et al. | 415/115 |
| 4,483,168 | 11/1984 | Sherman | 72/220 |

FOREIGN PATENT DOCUMENTS 3446206 7/1985 Fed. Rep. of Germany .... 416/97 R

Primary Examiner—Robert E. Garrett
Assistant Examiner—Joseph M. Pitko
Attorney, Agent, or Firm—William G. Rhines

[57] ABSTRACT

This invention relates to vanes for gas turbines and methods for making them. Embodiments include vanes that have internal fluid travel paths and cavities to permit the passage of fluids therethrough. Such embodiments have an internal structure member supporting an outer shell which has been formed so as to have outer surfaces in the configuration desired for a vane, and has been retentively positioned on said structural member. The outer surfaces of the support member are so configured that together with the inner surfaces of the cover, they form desired internal travel paths and cavities. Embodiments include such structures and methods for making same wherein the internal support structure is made in accordance with the teachings of U.S. Pat. No. 4,483,168.

20 Claims, 3 Drawing Sheets

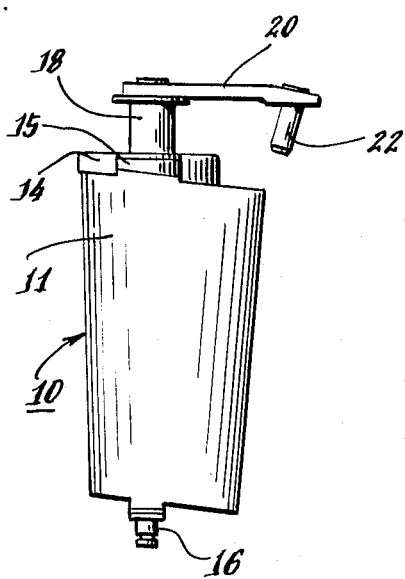
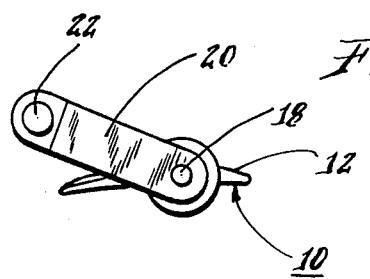
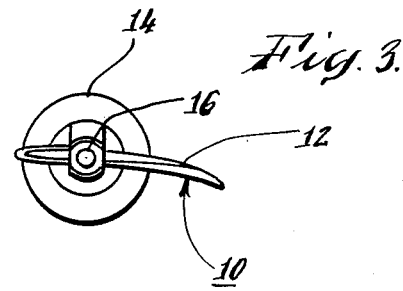
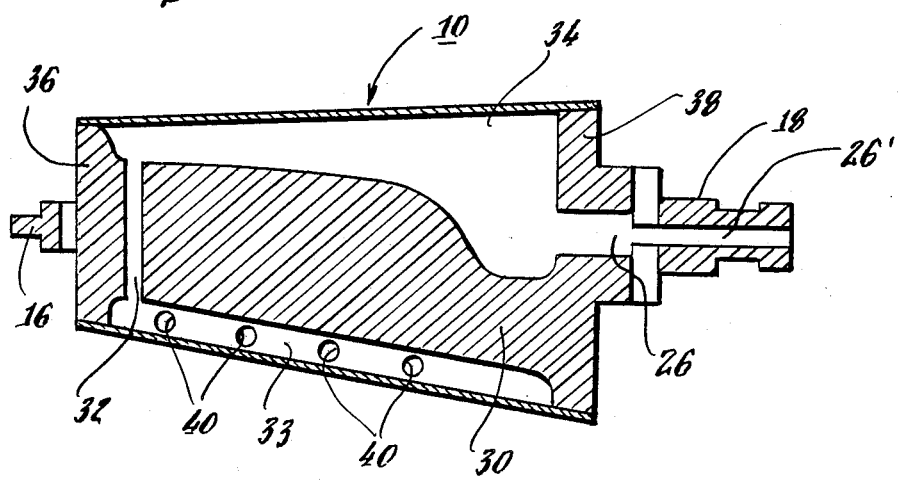
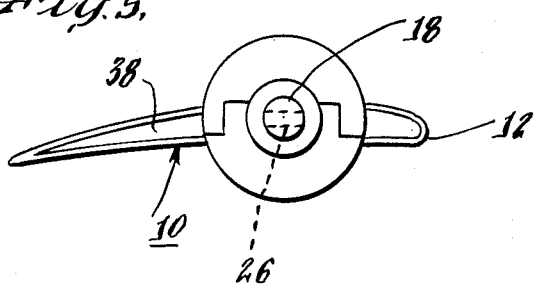
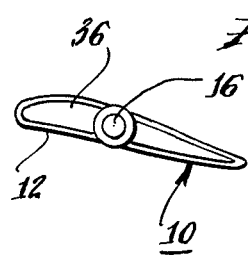

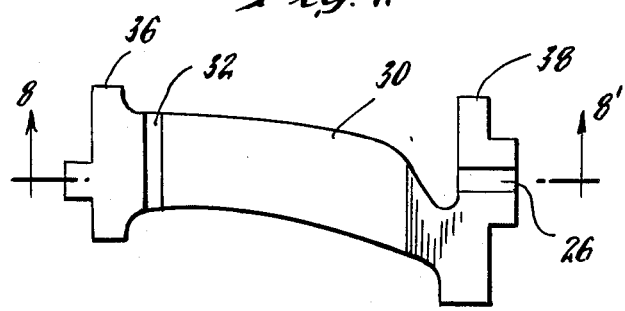
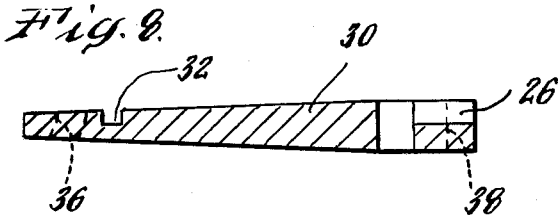
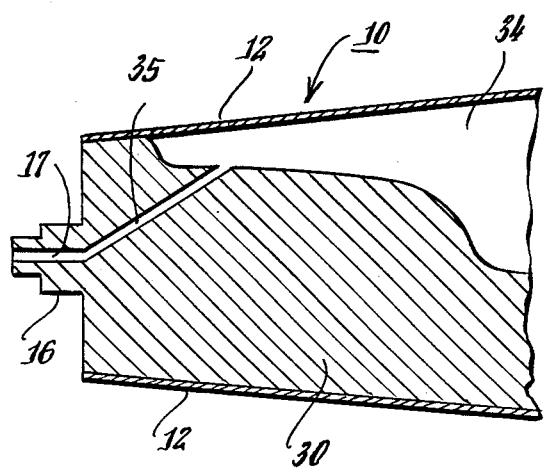
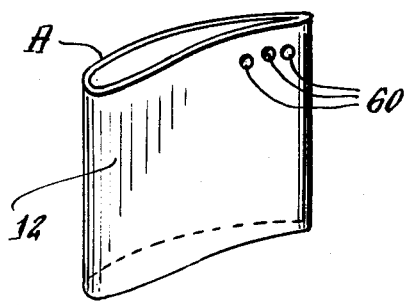
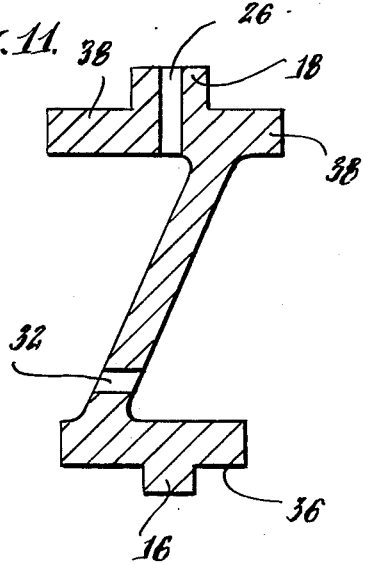
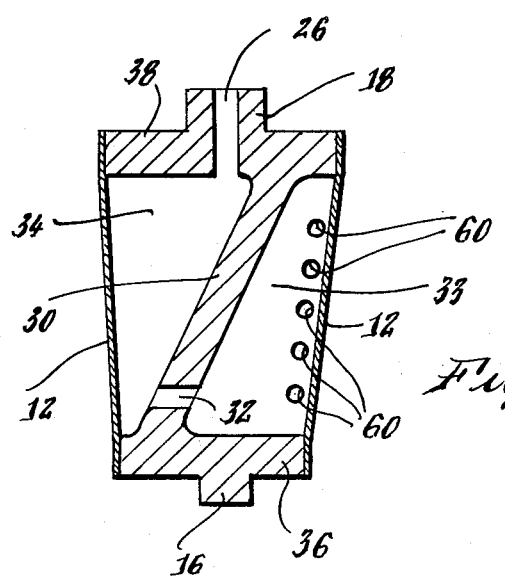

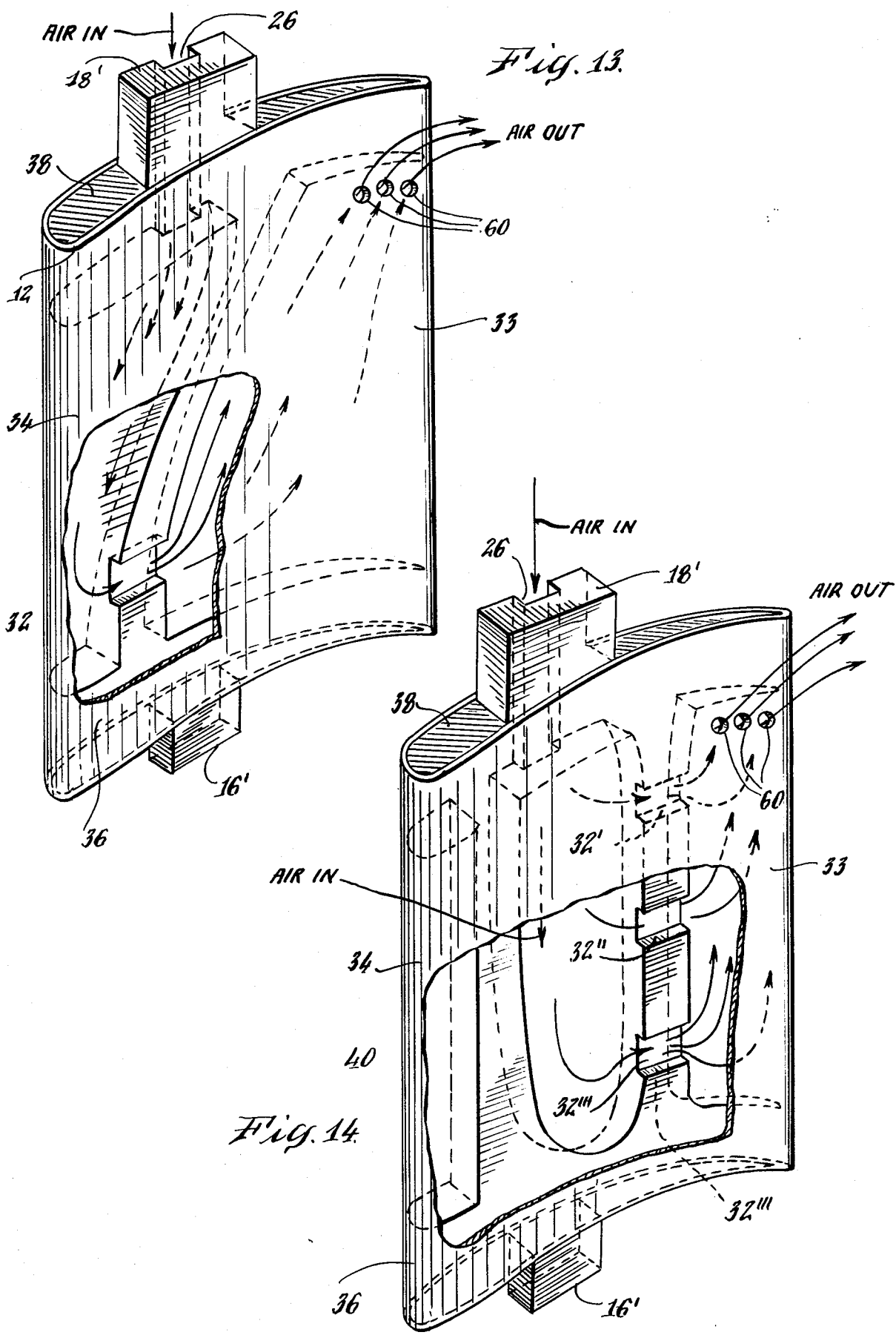

GAS TURBINE VANES AND METHODS FOR MAKING SAME

BACKGROUND OF INVENTION

In the design, engineering, and construction of gas turbines, such as jet engines, turbo-prop engines, and other devices, vanes are used for a variety of purposes. For example, in the compressor section of such gas turbines, a multiplicity of blades are affixed to a rotor, usually in circumferential rows, for the purpose of increasing the volume and pressure of the air being introduced into the combustion section of the engine. Vanes add fixed to the fixed portion of the engine surrounding the rotor are positioned at the entrance of the compressor section and immediately behind the rows of rotor blades. These blades serve as guides to ensure that the flow of air comes at each of the rotor blades substantially along a fixed, pre-determined path of travel, so that the blades will function properly. By this means, phenomena such as angular set induced by rotation of the rotor are effectively nullified. The vane structures typically are very complex geometrically. Usually, they are in the general shape of a regular air-foil, having a flat or slightly concave base and an opposing surface in the shape of a section of a parabola. They may be of substantially uniform cross-section geometrically and dimensionally throughout their length, or may be of a varying dimensions and/or cross-sectional shapes along their length, and may taper down in the direction of their tips. Further, typically they twist slightly along their length, and such twisting may or may not be in a uniform amount per unit of distance along the blade. Difficulties encountered in the manufacture of the vast variety and complexity of such devices have been accommodated by forming such vanes according to the teachings of my U.S. Pat. No. 4,483,168, to which reference is made.

As the technology of building such engines has advanced, the performance requirements of the vane structures have also changed. More particularly, the vanes in the compressor section experience the passage of air at up to supersonic speeds, and therefore are subjected to severe resonances, vibration, and pressures. In addition, they tend to become iced-up, particularly in the region of their leading edges. The icing phenomenon, which is a common occurrence under certain atmospheric conditions with an airfoil past which air is moving, and the causes and physical bases for which are now well known, is a phenomenon of particular concern in this context. It often effectively changes the shape of a vane so radically as to disrupt its ability to perform its intended functions efficiently and/or in accordance with its design parameters. Therefore, to preclude this from happening, there is an emerging interest in vanes which are adapted to have temperature-altering fluids, such as heated air, pass through them. Such fluids, after having passed through the vane, may be discharged through the outer surfaces of the vane into the air stream passing through the engine, or they may pass in one end of the vane and out the other for subsequent discharge at a different location.

There are several problems involved in making such vanes. First, as a practical matter, it is virtually impossible to form such devices totally from solid pieces of material, or to cast or forge them, with the internal channels and cavities that are necessary to distribute the fluid through the vane as desired. The environment in which the vanes are used is such as to require the use of metals, such as Inconel or stainless steel, which are very hard and difficult to machine, cast, forge, bore or otherwise alter appropriately. Further, the exterior geometry of such vanes is governed by design parameters which are germane primarily to what is desired to occur with respect to air-flow, and to which, therefore, other design considerations must yield. Those air flow design considerations typically at least complicate and sometimes even render impossible facilitating the kind and extent of interior cavitation and channeling that is required. On the other hand, simply to form a hollow vane from sheet metal with a desired outer surface configuration, for example, has proved not to be satisfactory. Such a construction lacks the strength and durability necessary to withstand the rigors of the severe environment in which such vanes typically are used Accordingly, it is within the contemplation of this invention to overcome these difficulties by producing vanes having fluid passage capability, comprising an interior support structure upon which is retentively positioned an exterior cover member of desired outer configuration for a vane, wherein the exterior surface of the support member is so configured and dimensioned as to form, together with the interior surfaces of the cover, passageways and cavities of desired dimensions, configurations, and locations to effect distribution of the fluids as desired for their intended purposes.

However, such internal support structures typically must be very complex in shape and configuration in order to create, in combination with the cover member, the desired configuration of conduits and chambers for fluids. Particularly with respect to the materials from which they must be made, such as Inconel or stainless steel, they are difficult or not feasible to produce in final form by casting, forging, machining, boring, or other traditional means. Therefore, it is also within the contemplation of this invention that such support members may be the product of having been made in accordance with the teachings of my U.S. Pat. No. 4,483,168.

Accordingly, an object of this invention is to produce gas turbine vane adapted for the passage of fluids therethrough.

Another object of this invention is to provide vanes which achieve the foregoing objective, in a wide variety of complex external shapes and dimensions.

Still another object of this invention is to produce vanes which achieve one or more of the foregoing objectives wherein each vane comprises a support structure upon which is retentively positioned an outer cover having an outer surface of desired shape and configuration .

Yet another object of this invention is to produce vanes which achieve one or more of the foregoing objectives, having a support member which is so dimensioned and shaped that its outer surface, in combination with the inner surface of an outer cover retentatively position thereon, forms internal fluid passageways and cavities of desired shapes locations, and configurations.

Another object of this invention is to produce vanes which achieve one or more of the foregoing objectives, each of which has an internal support structure that is the product of having been formed in accordance with the teachings of U.S. Pat. No. 4,483,168.

STATEMENT OF INVENTION

Desired objectives may be achieved by practice of this invention to produce a gas turbine vane having fluid transfer capabilities and methods for making same, wherein such vane comprises a support member and an outer cover of desired outer configuration retentively positioned upon said support member, the outer surface of said support member being so dimensioned, shaped and configured that, together with the configuration of the inside surfaces of said cover, internal passageways and cavities are formed in the vane for the transmission of fluids from the base of said vane to fluid egress means, which optionally may apertures extending through said cover. Advantageously, such support members may be the product of having been made made in accordance with the teachings of U.S. Pat. No. 4,483,168.

DESCRIPTION OF DRAWINGS

This invention may be understood from the foregoing description and that which follows, and from the accompanying drawings which FIG. 1 depicts a vane of the type in which this invention may be embodied, FIG. 2 is a view of the inner, control rod end of the embodiment of this invention shown in FIG. 1, FIG. 3 is a view of the end of the embodiment of this invention shown in FIG. 1 opposite that shown in FIG. 2, FIG. 4 is a cross-sectional plan view of an embodiment of this invention, FIG. 5 is a view of the inner, control rod end of the embodiment of this invention shown in FIG. 4, FIG. 6 is a view of the end of the embodiment of this invention shown in FIG. 4 opposite that shown in FIG. 5, FIG. 7 is a plan view of the support member in the embodiment of this invention shown in FIGS. 4 through 6, FIG. 8 is a cross-sectional view taken through line 8–8' in FIG. 7, FIG. 9 is a cross-sectional plan view of another embodiment of this invention, FIG. 10 is a perspective view of a cover member which may be used in embodiments of this invention, FIG. 11 is a cross-sectional plan view of a support member which may be used in embodiments of this invention, FIG. 12 is a cross-sectional view of an embodiment of this invention made using members depicted in FIGS. 10 and 11, FIG. 13 is a perspective view of an embodiment of this invention, and FIG. 14 is a perspective view of another embodiment of this invention.

PREFERRED EMBODIMENTS

FIG. 1 depicts a gas turbine vane 10 of the type in which the present invention may be embodied. It includes an outer surface 11 which, as will be seen from FIGS. 2 and 3, is generally airfoil shaped on cross-section and tapers down toward its outer end. (In this connection, it is to be understood that throughout this application, the designations "inner" and "outer" with respect to the vane being described refer respectively to the orientation of the vane itself and not to the engine in which it is used. Thus, the end of the vane at which the fluid enters, which usually is larger in cross-section, and usually is the location of a regulating arm if one is used, is referred to herein as the "inner" end of the vane. The other, opposite end of the vane toward which the fluid flows as it enters the vane is referred to herein as the "outer" end of the vane. This point is made to avoid confusion in orientation because usually, when in situ in an engine, the end of the vane herein designated as the "inner" end faces toward the outside of the engine, while the end of the vane herein designated as the "outer" end then faces toward the inside of the engine). The outer end of the vane may include a support shaft 16 by which the vane may be supported (and pinioned, if it is an adjustable vane) at its outer end by insertion into a correspondingly shaped receptacle in a support frame (not shown). The inner end of the vane includes a support structure 14 and a support shaft 18, to which may be affixed a control arm 20, if the vane is to be an adjustable one, for moveable interconnection by means of pin 22 with control linkages (not shown). By operation of such a control arm means in the case of an adjustable vane, the vane, when positioned in its desired site, may be caused to be rotated about the shafts 16,18 so as to regulate its angle of attack with respect to the air stream to which it is exposed. FIG. 2 is a view of the inner end of the structure depicted in FIG. 1, showing such an optional control rod 20. It also shows the relationship of several of the components referred to above. Similarly, FIG. 3 in a view of the opposite, outer end of the same embodiment.

FIGS. 4 through 8 are views of an embodiment of this invention showing the various members from which it is constructed. FIG. 4 is a cross-sectional plan view of a vane 10, having an outer cover 12 and an inner support member 30, to which are affixed support shafts 16,18 for the same purposes described above. The shaft 18 includes a primary air passage 26' through which air may be introduced into the interior of the vane as hereinafter described. The shafts 16,18 may be made as separate pieces and then attached to the central support member by means such as brazing, since this may facilitate their production and adaptation to be fitted to the support member and to their respective corresponding supports. However, it is within the contemplation of this invention that the shafts preferably are formed as part of the central support member. The central support member 30 is shown in FIG. 4 in situ within a vane and per se in FIGS. 7 and 8. From them, it will be seen that the support member 30 includes an air ingress channel 26 corresponding in location, configuration, and dimensions to the passageway in the shaft 18 if such a shaft has been used as a separate member, and a secondary air channel 32. As is illustrated particularly in FIGS. 7 and 8, an advantage of this invention is that structural features such as the various chambers and secondary air channels such as the channel 32 may be easily formed as part of the outer contour of the support member. However, they may also be formed by drilling, machining or other known per se means. Thus, an alternative form for the secondary passageway 32 to the surface groove depicted in FIGS. 7 and 8 might be a round hole drilled through the body of the support member 30 to create a comparable path of travel for the fluid to that shown in those Figures. The support member 30 also includes an inner end portion 38 and an outer end portion 36 which, as may be seen from FIGS. 5 and 6 (views respectively of the inner end and the opposite, outer end of the vane 10 shown in FIG. 4), are also generally air-foil shaped, and substantially of the same cross-sectional shape and dimensions (less the thickness of the outer cover member) as is the finished vane overall. Although it is possible for the end portions 36, 38 to be formed by separate pieces that are affixed, as by brazing, at the inside of the ends of the outer cover, it will be seen to be advantageous to simplify assembly by incorporating them as part of the structure of the central support member 30. It should also be noted that the front and back long edge contours of the inner support member 30 are irregular in configuration. As will be apparent from FIG. 4, by this means, when an outer cover member 12 has been formed from sheet metal made from suitable materials such as Inconel or stainless steel, and has been retentively positioned upon the central support core 30, such shaping of the front (shown at the top of FIGS. 4 and 7) and back portions of the support member 30, together with the inner facing surface of the cover 12, effectively produces cavities 34, 33. The cavity 34 is the initial cavity to receive heated air entering the vane 10 through the primary air passageway 26. As such, it becomes a heat source by which ice may be prevented from forming on the vane and by which any ice that has formed on the outer surface of the leading edge of the vane may be caused to be loosened and to fly free from the surface of the vane. Of course, the exact configurations, and locations and number of chambers and channels that can be produced are virtually without limit. For example, it will be seen that the cavity 34 tapers downward with a progressively reducing cross-sectional area as one proceeds in the direction of the outer end of the vane. This illustrates that the contour, shape and dimensions of the leading edge of the support member 30 may be so adjusted as to produce a cavity 34 in which the cross-sectional area of the cavity at any given point along the path of travel of the heated air through the cavity will correspond generally to the reduction in volume of the admitted air due to cooling as the air moves along its travel path. Heating of the back edge of the vane, while sometimes not a consideration or objective, frequently is desired as also is heating of the entire vane. If such rear area heating is not an objective, the rear cavity 33 may be included anyway primarily to distribute the used air to holes 40 through the outer cover 12 so that it may thereby be carried off in the air stream passing through the engine. An alternative to discharging air through the cover of the vane, whether or not a rear cavity is included for other reasons, such as weight saving, is to have the air egress end of the front cavity 34 feed via a secondary channel 33 directly into a exit port 17 which extends through the shaft 16, as is shown in FIG. 9. Following that, it may be discharged to the atmosphere through ports or other appropriate means (not shown). Although a series of holes is shown along the trailing edge of the vane shown in FIG. 4 as a means for getting rid of the used air to the atmosphere, other configurations of apertures through the outer cover are also within the contemplation of this invention. Thus, the embodiments of this invention shown in FIGS. 4, 10, 12, 13 and 14 show round holes, but of course any of a wide variety of holes or slots, or differently shaped apertures, might also or in the alternative be used.

In FIGS. 10 through 12 there is illustrated another embodiment of this invention from which steps of methods embodying this invention will also be clear. FIG. 10 is a perspective view of a cover member 12 that has been formed from appropriate material in sheet form, such as Inconel or stainless steel. As such, a blank has been bent over upon itself along a bend line with a bending radius A that is appropriate to produce the desired contour without introducing a crack along the bend line. Egress holes 60 have been formed near one edge of the sheet blank to provide exit means for used air as hereinbefore described. It should also be noted that although FIG. 10 shows a cover member that has been formed from a single blank made from sheet metal, it is also within the contemplation of this invention that cover members may be made by any of a wide variety of other known per se methods. Thus, for example, one might pre-form cover halves by stamping them out, and then braze or weld the two halves together. FIG. 11 is a cross-sectional view of a support member that has been formed in a shape which is appropriate for its intended use, but which is somewhat different in exact contour, shape, dimensions, and configuration from others discussed herein. This further illustrates that a wide variety of forms of structures are within the contemplation of this invention.

In the support member shown in FIG. 11, end members 36, 38 have been included as previously discussed, as has also a secondary channel 32 to distribute air from the front cavity 34 to the rear cavity 33 to heat the rear portion of the vane and for subsequent discharge through the holes 60 shown in FIG. 12. FIG. 12 illustrates the finished vane assembly using the components shown in FIGS. 10 and 11, following completion of the steps necessary to carry out the methods which also embody this invention. As will be apparent from the foregoing, those methods comprise forming a cover member of desired outer configuration for a vane, forming a support member with outer contours such that, together with the inside contours of the outer cover when the cover is positioned on the support member, fluid passageways and/or chambers of desired configurations, dimensions and locations will be formed within the vane for the passage of air therethrough, and retentively positioning said cover on said support member.

FIG. 13 illustrates yet another embodiment of this invention. As such, it is of different structure than those embodiments previously discussed. For example, the end supports 16, 18 are not round in cross-section, as are those in some of the previous Figures. This is to demonstrate that in any of the embodiments of this invention, support means may be provided to hold the vane in fixed, unrotateable position. Further, the configuration of the holes 60 shown in FIG. 13 is a different, alternative means to exhaust spent air from the vane. Similarly, FIG. 14 illustrates yet another embodiment of this invention, having an internal chamber 40 to better achieve and ensure more uniform heating of the center part of the vane structure. It also has multiple secondary distribution channels 32', 32'', and 32''' through which air may pass before discharge into the external air stream through the holes 60. It should be noted that in this particular embodiment there is a front chamber 34, but it is not connected to the heated air source and therefore does not provide any heating action on the front of the vane. This is because such vanes are used in sites where icing of the front of vanes is not a problem. However, the Figure further illustrates the wide variety of variants in which this invention may be embodied.

It will be apparent from the foregoing that the proper formation of the central support member in particular is an exacting task which must be carried out with the utmost precision if optimum results are to be achieved.

Not only are the shapes intricate and the tolerances critical and close, but they must be carried out on materials, such as Inconel or stainless steel, which are very difficult to work, even under simpler circumstances. This problem has previously been addressed in my U.S. Pat. No. 4,483,168, which disclosed and claimed new and novel apparatus for forming intricately shaped pieces from such materials. In the specification and claims of this application, that apparatus is referred to as the "Low Friction, Hard Metal, Roll-Forming Apparatus", the method which that apparatus embodies is referred to as the "Low Friction, Hard Metal, Roll-Forming Method", and the end products of that apparatus are referred to as "Low Friction, Hard Metal Roll-Formed Articles". The advantages of utilizing such apparatus to produce support core members of the type herein contemplated as Low Friction, Hard Metal Roll-Formed Articles will be apparent. It is to be understood, therefore, that it is within the contemplation of this invention that embodiments of this invention may comprise a central support member upon which is retentively positioned a cover having outside surfaces of desired configuration for use as a gas turbine vane, wherein the outside surface of the support member is so configured and dimensioned that, together with the inside surfaces of the cover, it will form desired passageways and cavities for the passage of fluids through said vane, and wherein the support member is a Low Friction, Hard Metal, Roll-Formed Article within the foregoing definition of that term. It is to be understood that the embodiments herein disclosed, discussed and shown are by way of illustration and not of illustration, and that a wide variety of embodiments may be made without departing for the spirit or scope of this invention.

I claim:

1. A gas turbine vane that is adapted to have fluids pass therethrough comprising
   a support member
   and a cover member having outer surfaces of predetermined configuration for a gas turbine vane,
   said cover member being retentively positioned on said support member by having been bonded to said support member at locations other than those at which the hereinafter-described passageways and chambers have been formed,
   the outside surfaces of said support member being so configured and dimensioned that, together with the inside surfaces of said cover when said cover is so positioned on said support member, passageways and chambers of predetermined size, shape, configuration and location are formed for fluid to pass through as it passes through said vane.

2. The device described in claim 1 wherein said support member is a Low Friction, Hard Metal, Roll-Formed Article.

3. The device described in claim 1 wherein said cover is formed from sheet metal.

4. The device described in claim 1 wherein said support member is a Low Friction, Hard Metal, Roll-Formed Article and said cover is formed from sheet metal.

5. A vane for a gas turbine comprising
   a central support structure,
   an outer covering member that has outer surfaces in a predetermined configuration,
   and support means at each end of said vane for supporting said vane when in situ in a jet engine,
   said vane having fluid ingress means at one of its ends and including fluid egress means, and having at least one internal chamber that is interconnected with and intermediate to said fluid ingress means and said fluid agress means for the flow of fluids therethrough,
   wherein said internal chamber is formed by contours in the external surfaces of said support member and the inner surfaces of said outer cover member,
   and wherein said cover member is retentively positioned on said support member by having been bonded to said support member at locations other than those a which said chamber has been formed.

6. The device described in claim 5 wherein said fluid ingress means and said fluid egress means include passageways that have been formed by contours in the external surfaces of said support member and the inner surfaces of said outer cover member.

7. The device described in claim 6 wherein said fluid egress means includes apertures extending through said cover member in the region of the trailing edge of said vane.

8. The device described in claim 6 wherein said support member includes end portions having outer contours corresponding to the inner contour of said cover whereby said cover is structurally supported by said end portions at its ends.

9. The device described in claim 5 wherein said fluid egress means includes apertures extending through said cover member in the region of the trailing edge of said vane.

10. The device described in claim 5 wherein said support member includes end portions having outer contours corresponding to the inner contour of said cover whereby said cover is structurally supported by said end portions at its ends.

11. A method of making a jet engine vane that is adapted for the flow of fluid therethrough comprising the steps of
    forming an outer cover member having outside surfaces of predetermined configuration for a jet engine vane,
    forming a support member upon which said cover member may be retentively positioned, with the outer surface of said support member so configured that, together with the inside surfaces of said support member, a receptacle for fluid is created that is inside said vane and is interconnected with and intermediate to ingress means by which fluid may be introduced into said receptacle and egress means by which fluid may be removed from said receptacle when said cover is retentively positioned upon said support member,
    and retentively positioning said cover member upon said support member by having bonded to said support member at locations other than that at which said receptacle is located.

12. The method described in claim 11 wherein the step of forming said support member includes so contouring its outer surfaces that passageways for the ingress and egress of fluids from said receptacle are formed by them and inside surfaces of said cover member.

13. The method described in claim 12 wherein said receptacle is a chamber located in the region of the leading edge of said vane.

14. The method described in claim 12 including the step of forming said support member on Low Friction, Hard Metal, Roll-Forming Apparatus.

15. The method described in claim 12 wherein said step of forming said support member includes the step of forming end portions thereon configured so as to act as supports for the interior of the ends of said cover member.

16. The method described in claim 11 wherein said receptacle is a chamber located in the region of the leading edge of said vane.

17. The Method described in claim 16 including the step of forming said support member on Low Friction, Hard Metal, Roll-Forming Apparatus.

18. The method described in claim 11 including the step of forming said support member on Low Friction, Hard Metal, Roll-forming Apparatus.

19. The method described in claim 18 wherein said step of forming said support member includes the step of forming end portions thereon configured so as to act as supports for the interior of the ends of said cover member.

20. The method described in claim 11 wherein said step of forming said support member includes the step of forming end portion thereon configured so as to act as supports for the interior of the ends of said cover member.

* * * * *